United States Patent
Nihei

(10) Patent No.: US 6,891,634 B1
(45) Date of Patent: May 10, 2005

(54) MULTIPLE-PRINTER CONTROL APPARATUS AND METHOD

(75) Inventor: Kaname Nihei, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/377,821

(22) Filed: Aug. 20, 1999

(30) Foreign Application Priority Data

Aug. 25, 1998 (JP) ............................................. 10-253315

(51) Int. Cl.⁷ ............................. G06F 3/12; G06F 13/00
(52) U.S. Cl. ...................................... 358/1.15; 358/1.2
(58) Field of Search ................................ 358/1.15, 1.1, 358/1.2, 1.4, 1.6, 1.9, 1.13, 1.14, 1.18, 402, 403, 449, 501, 401, 503, 504, 451, 453, 1.11, 1.12, 1.16, 1.17; 709/223, 224, 228–232; 710/227, 19, 46, 47, 2–9, 13, 31–34

(56) References Cited

U.S. PATENT DOCUMENTS

| | | | | |
|---|---|---|---|---|
| 5,140,674 A | * | 8/1992 | Anderson et al. | 395/111 |
| 5,995,722 A | * | 11/1999 | Kishida | 395/114 |
| 6,348,971 B2 | * | 2/2002 | Owa et al. | 358/1.15 |

* cited by examiner

*Primary Examiner*—Douglas Tran
(74) *Attorney, Agent, or Firm*—Birch, Stewart, Kolasch, & Birch, LLP.

(57) ABSTRACT

A plurality of printers are used in an efficient manner. The printing time of each of a plurality of printers is detected, and so is the overall printing workload of printing performed using the plurality of printers. On the basis of the detected printing times and overall printing workload, print processing by the plurality of printers is controlled in such a manner that print processing executed by the plurality of printers ends approximately simultaneously. As a result, images of a plurality of frames can be printed promptly.

13 Claims, 21 Drawing Sheets

| PRINTER | PROCESSING CAPABILITY | ALLOCATED JOB QUANTITY |
|---|---|---|
| A | 2 | 21 |
| B | 1 | 11 |
| C | 1 | 10 |
| D | 2 | 21 |
| E | 2 | 21 |

Fig. 3

```
MENU SELECTION
     PRINTER VERIFICATION MENU
     PRINT-IMAGE SELECTION MENU
     TEMPLATE-IMAGE SELECTION MENU
```

Fig. 4

PRINTER VERIFICATION

| ID | CONNECTED? | PRINTING POSSIBLE? | NUMBER OF PRINTS POSSIBLE |
|---|---|---|---|
| IDA: | YES | ○ | 150 |
| IDB: | YES | ○ | 200 |
| IDC: | YES | ○ | 59 |
| IDD: | YES | × | 0 |
| IDE: | YES | ○ | 8 |
| IDF: | NO | — | |
| IDG: | NO | — | |

Fig. 6

PRINTING TIME FOR EACH PRINT SIZE

| PRINTER | SIZE A5 | SIZE A6 |
|---------|---------|---------|
| A | 50 SEC | 25 SEC |
| B | 100 SEC | 50 SEC |
| C | 100 SEC | 50 SEC |
| D | 50 SEC | 25 SEC |
| E | 50 SEC | 25 SEC |

*Fig. 10*

```
INPUT MEDIA SELECTION

MEMORY CARD
    MAGNETO-OPTIC DISK
    MAGNETIC DISK
    NO BACKGROUND IMAGE
```

Fig. 13

INPUT MEDIA SELECTION

MEMORY CARD
*MAGNETO-OPTIC DISK*
MAGNETIC DISK

Fig. 16

PRINTING IN PROGRESS     MAGNETIC DISK

TOTAL NUMBER OF PRINTS SPECIFIED    51
TOTAL NUMBER OF PRINTS COMPLETED   16

FRAME CURRENTLY BEING PRINTED
DATE : 10/10/98
FRAME NO. 18 : DSC00008.JPG

*Fig. 17*

| PRINT IMAGE | NUMBER OF PRINTS | PRINT SIZE | JOB QUANTITY |
|---|---|---|---|
| i1:DSC00001.JPG | 10 | A5 | 20(10×2) |
| i2:DSC00002.JPG | 5 | A6 | 5(5×5) |
| i8:DSC00008.JPG | 6 | A6 | 6(6×1) |
| i12:DSC00012.JPG | 10 | A5 | 20(10×2) |
| i27:DSC00027.JPG | 1 | A5 | 2(2×1) |
| i50:DSC00050.JPG | 1 | A5 | 2(1×2) |
| i101:DSC00101.JPG | 1 | A6 | 1(1×1) |
| i105:DSC00105.JPG | 3 | A5 | 6(3×2) |
| i122:DSC00122.JPG | 6 | A6 | 6(6×1) |
| i175:DSC00175.JPG | 8 | A5 | 16(8×2) |
| TOTAL | | | 84 |

JOB QUANTITY OF A6: "1"
JOB QUANTITY OF A5: "2"

*Fig. 18*

| PRINTER | PROCESSING CAPABILITY | ALLOCATED JOB QUANTITY |
|---------|----------------------|------------------------|
| A | 2 | 21 |
| B | 1 | 11 |
| C | 1 | 10 |
| D | 2 | 21 |
| E | 2 | 21 |

*Fig. 21*

PRINT IMAGES STORED
IN ORDER OF DECREASING
JOB QUANTITY

PRINTERS SORTED
IN ORDER OF DECREASING
ALLOCATED JOB QUANTITY

| PRINT IMAGE | JOB QUANTITY |
|---|---|
| i122 | 6 |

| PRINTER | JOB QUANTITY ALLOCATED TO PRINTER |
|---|---|
| B | 3 |
| C | 2 |
| D | 1 |

*Fig. 22*

| PRINTER | ALLOCATED PRINT IMAGE AND NUMBER OF PRINTS |
|---|---|
| A | i1 : 10, i101 : 1 |
| B | i2 : 6, i27 : 1, i122 : 3 |
| C | i105 : 3, i50 : 1, i122 : 2 |
| D | i12 : 10, i122 : 1 |
| E | i175 : 8, i2 : 5 | ically printer has not been stored, predetermined print data (e.g., image data represent-
MULTIPLE-PRINTER CONTROL APPARATUS AND METHOD

BACKGROUND OF THE INVENTION

1. Field of the Invention

This invention relates to a multiple-printer control apparatus and method for controlling printing performed by a plurality of printers.

2. Description of the Related Art

There are occasions where a plurality of printers are connected to a personal computer via a network. Even when a plurality of printers have been connected to a personal computer, print processing is executed using an individual printer on a print-job basis. There will also be printers that are not currently executing print processing. This means that not all of the printers connected to the personal computer can be used effectively.

SUMMARY OF THE INVENTION

Accordingly, an object of the present invention is to use a plurality of printers in an effective manner.

According to the present invention, the foregoing object is attained by providing a multiple-printer control apparatus for controlling a plurality of printers, comprising: a print-processing capability detection unit (print-processing capability detection means) for detecting print processing capability of each of the plurality of printers; an overall-workload detection unit (overall-workload detection means) for detecting overall workload of printing performed using the plurality of printers; and a printer control unit (printer control means) for performing control, on the basis of print processing capabilities detected by the print-processing capability detection unit and the overall workload detected by the overall-workload detection unit, in such a manner that print data, which represents at least one of images and characters to be printed, is applied to each of the plurality of printers, and each printer of the plurality of printers prints at least one of images and characters the number of sheets whereof conforms to a number of prints.

The present invention provides also a method suited to the apparatus described above. Specifically, the present invention provides a multiple-printer control method for controlling a plurality of printers, comprising the steps of: detecting processing capability of each of the plurality of printers; detecting overall workload of printing performed using the plurality of printers; and performing control on the basis of the detected print processing capabilities and overall workload in such a manner that print data, which represents at least one of images and characters to be printed, is applied to each of the plurality of printers, and each printer of the plurality of printers prints at least one of images and characters the number of sheets whereof conforms to the number of sheet to be printed.

In accordance with the present invention, the processing capability of the connected printers is detected and so is the overall printing workload. On the basis of the detected processing capability of the printers and the detected overall workload, print data is applied to each printer and at least one of images and characters is printed.

For example, the plurality of printers is controlled in such a manner that the print processing executed by the plurality of printers ends approximately simultaneously.

Thus, a plurality of printers can be used effectively and a plurality of print processing operations can be finished promptly.

Data representing the print processing capability of each printer may be stored in advance. The print processing capability may therefore be detected by reading out the stored data representing the print processing capability.

An arrangement may be adopted in which it is judged whether data representing print processing capability has been stored. When it is judged that such data has not been stored, predetermined print data (e.g., image data representing a single-color image of a prescribed size) is applied to the printer for which it has been judged that the data has not been stored, and this printer is made to execute print processing. Data representing the print processing capability of this printer can be detected based upon the print processing executed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3 and 4 are diagrams showing examples of display screens on a monitor display unit;

FIG. 6 is a diagram illustrating print processing times of a plurality of printers;

FIGS. 10 to 16 are diagrams showing examples of display screens on the monitor display unit;

FIG. 17 is a table showing print images, number of prints, print sizes and print-job quantities;

FIG. 18 is a table showing processing capabilities of printers and job quantities allocated to the printers;

FIGS. 19 to 21 are diagrams illustrating processing for allocating print jobs to printers according to this embodiment;

FIG. 22 is a diagram illustrating print images and number of prints allocated to printers.

DESCRIPTION OF THE PREFERRED EMBODIMENT

Figure 1:
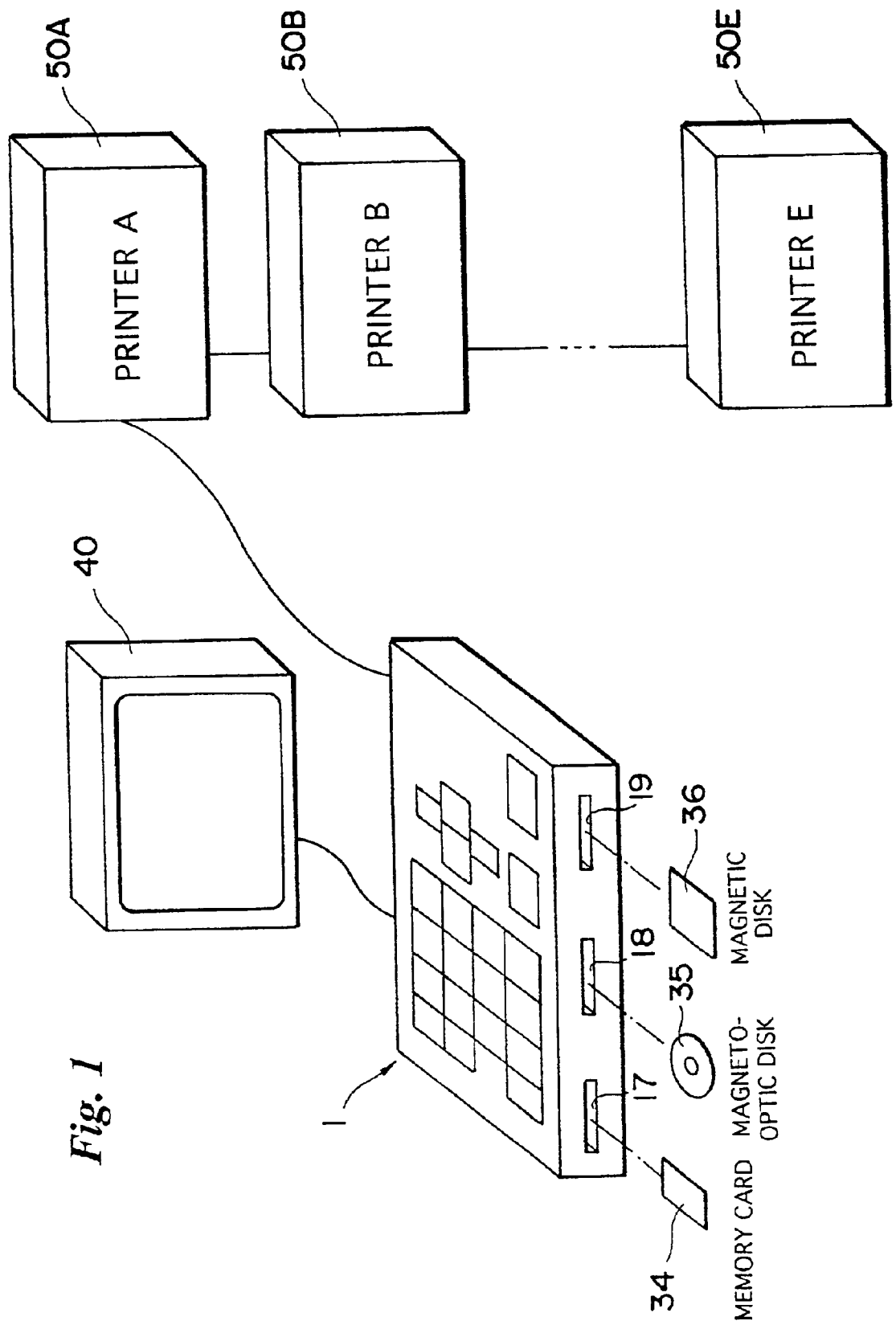
FIG. 1 is a diagram showing a multiple-printer control system according to an embodiment of the present invention.

FIG. 1 illustrates an embodiment of the present invention and shows the overall configuration of a multiple-printer control system.

The multiple-printer control system comprises a multiple-printer control apparatus 1, a monitor display unit 40 and five printers 50A to 50E. (Though five printers are illustrated, any number of a plurality of printers may be connected.)

When a plurality of images are printed, the multiple-printer control apparatus 1 allocates the image data representing the plurality of images to the printers 50A to 50E and controls the printing operation of the printers 50A to 50E, whereby the plurality of images are printed in prompt fashion.

The multiple-printer control apparatus 1 has a front side formed to include a memory-card slot 17 for inserting a memory card 34, a magneto-optic disk slot 18 for inserting a magneto-optic disk 35, and a magnetic-disk slot 19 for inserting a magnetic disk 36. Image data representing a plurality of images that have been recorded on the memory card 34, magneto-optic disk 35 and magnetic disk 36 are read out by the multiple-printer control apparatus 1 and allocated to each printer of the printers 50A to 50E.

Figure 2:
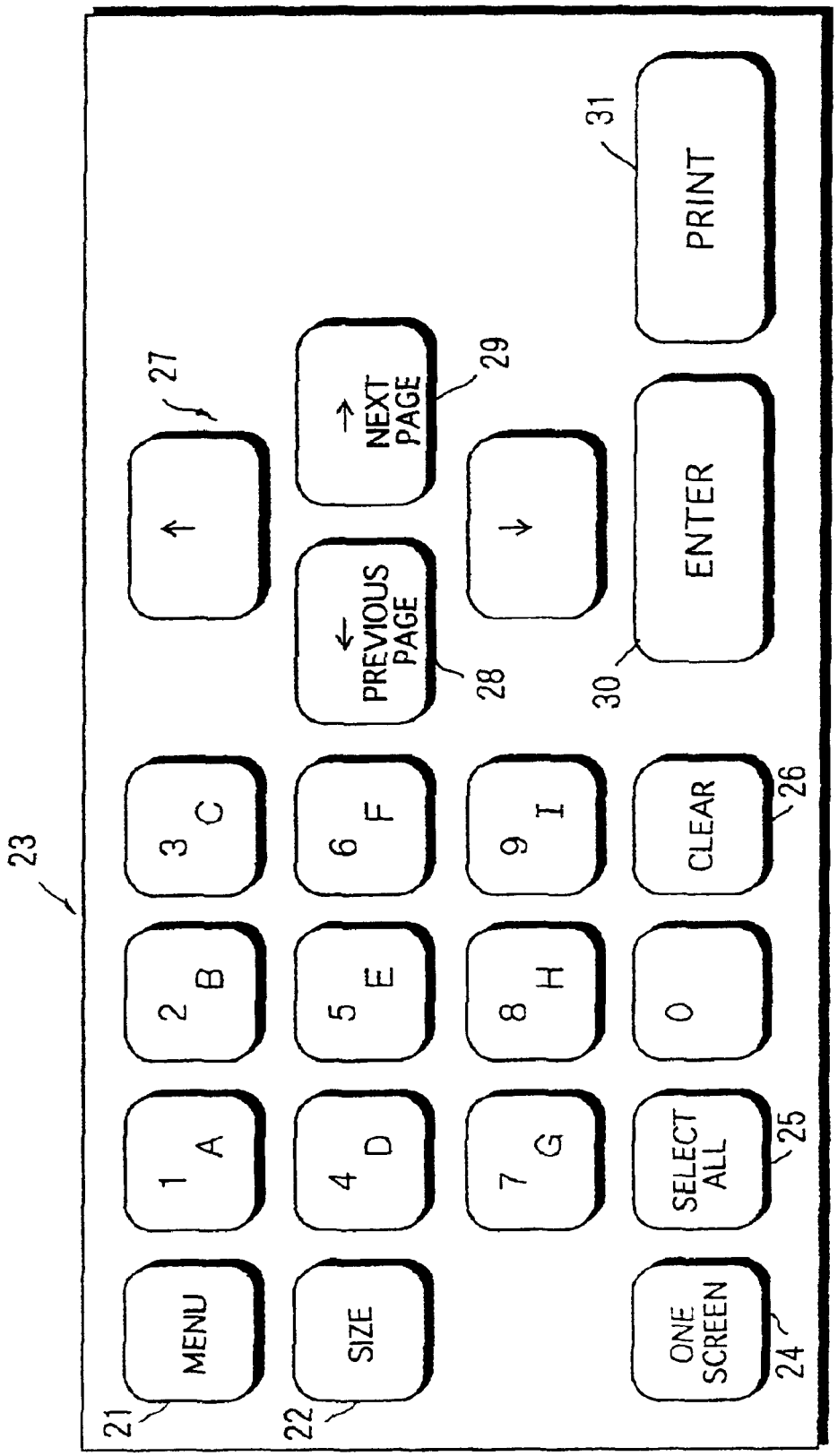
FIG. 2 is a diagram showing a control panel of a multiple-printer control apparatus according to this embodiment.

FIG. 2 illustrates a control panel provided on the top side of the multiple-printer control apparatus 1.

The control panel includes a menu selection button 21, a size selection button 22, a numeric key pad 23, a single-screen selection button 24 pressed by the user when one frame of an image is to be displayed on the entire display screen of the monitor display unit 40, a total-selection button 25 for selecting a plurality of images being displayed on the monitor display unit 40, a clear button 26, cursor keys 27 (the cursor keys 27 include a previous-page key 28 for turning a page back to the previous page and a next-page key 29 for turning a page ahead to the next page), an enter button 30 and a print button 31.

FIGS. 3 and 4 illustrate examples of display screens on the monitor display unit 40.

FIG. 3 illustrates the menu selection screen. In a case where the menu selection button 21 provided on the control panel of the multiple-printer control apparatus 1 is pressed by the user, a menu selection screen is displayed on the display screen of the monitor display unit 40.

Menus include a printer verification menu, a print-image selection menu and a template-image selection menu. The printer verification menu is set by the user when a printer that has been connected to the multiple-printer control apparatus 1 is verified. The print-image selection menu is set by the user when an image to be printed is selected. The template-image selection menu is set by the user when a template image to be used as background is selected.

Any of the menus among the menus being displayed on the menu selection screen is selected by pressing the cursor keys 27 provided on the control panel of the multiple-printer control apparatus 1. The menu that has been selected is displayed in italics. The selected menu is entered by pressing the enter button 30.

FIG. 4 shows the screen of the printer verification menu. This screen is displayed on the monitor display unit 40 in response to selection and entering of the printer verification menu by the user.

Each printer is assigned an ID and the ID is displayed on the printer-verification menu screen. This screen displays by ID the printers that have and have not been connected to the multiple-printer control apparatus 1. A connected printer is indicated by "YES" and an unconnected printer is indicated by "NO". Whether or not printing can be performed by a printer is displayed on the printer-verification menu screen. A printer capable of printing is indicated by a "○" mark and one that is not capable of printing is indicated by an "x" mark. If a printer has not been connected to the multiple-printer control apparatus 1, this is indicated by a "-" mark. The number of sheets capable of being printed by each printer also is indicated in the printer verification menu.

Figure 5:
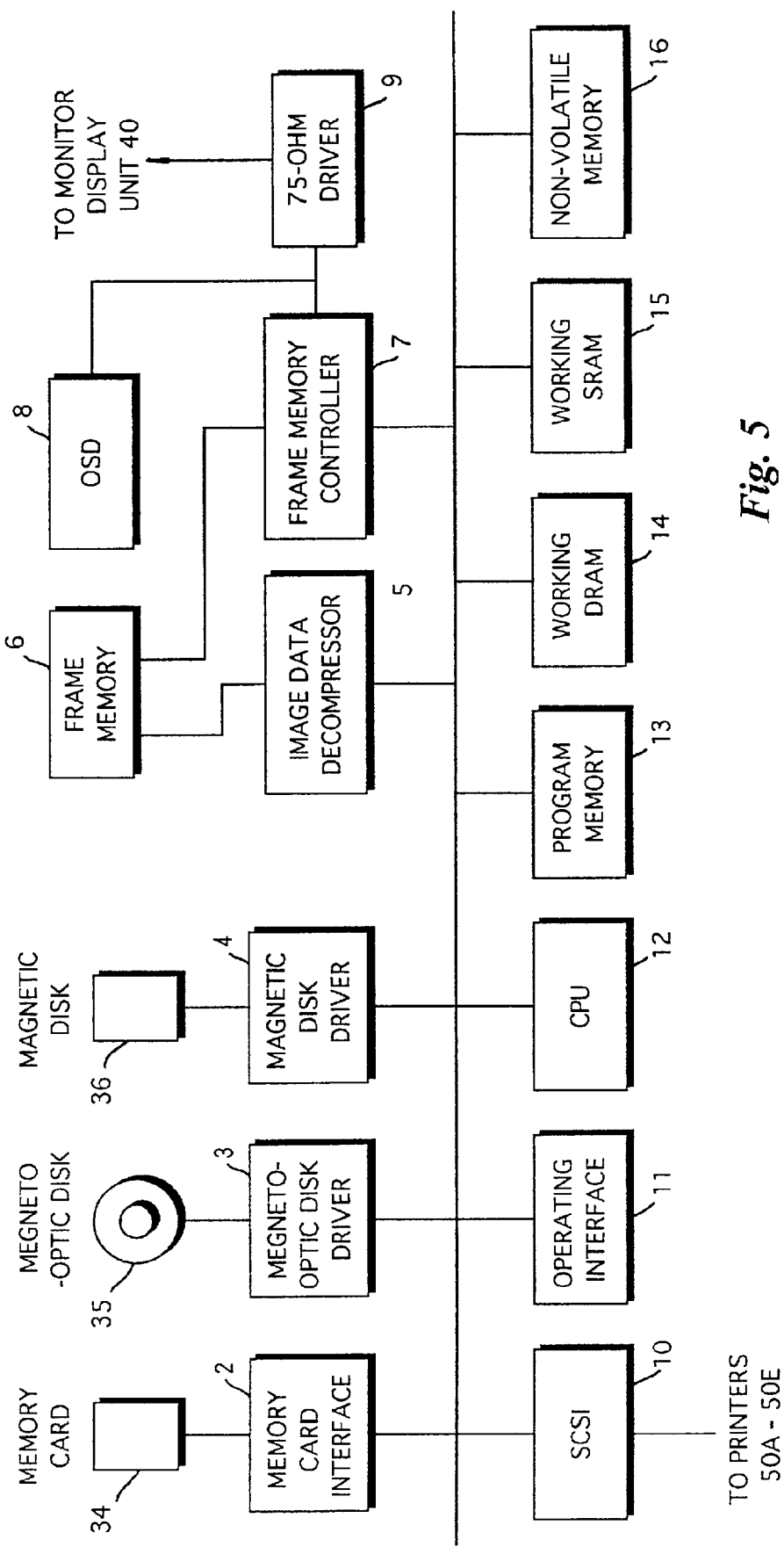
FIG. 5 is a block diagram showing the electrical construction of the multiple-printer control apparatus according to this embodiment.

FIG. 5 is a block diagram showing the electrical construction of the multiple-printer control apparatus 1.

The overall operation of the multiple-printer control apparatus 1 is controlled by a CPU 12.

Image data that has been recorded on the memory card 34 is read out by a memory card interface 2, image data that has been recorded on the magneto-optic disk 35 is read out by a magneto-optic disk driver 3, and image data that has been recorded on the magnetic disk 36 is read out by a magnetic disk driver 4.

If the image data read out has been compressed, the data is decompressed in an image-data decompression circuit 5, applied to a frame memory 6 and stored temporarily. If the read image data has not been compressed, the data merely passes through the image-data decompression circuit 5 and is applied to the frame memory 6 to be stored there temporarily. Image data stored temporarily in the frame memory 6 is read out by a frame memory controller 7 and applied to the monitor display unit 40 via a 75-ohm driver 9. The image represented by the image data read out of the frame memory 6 is displayed on the display screen of the monitor display unit 40. The multiple-printer control apparatus 1 includes an OSD (On-Screen Display) circuit 8. Data representing characters for being displayed on an image in superimposed form is output by the OSD circuit 8 and applied to the monitor display unit 40 via the 75-ohm driver 9. The image on which the characters have been superimposed is displayed on the display screen of the monitor display unit 40.

The multiple-printer control apparatus 1 includes an SCSI (Small Computer System Interface) 10 through which the printers 50A to 50E are connected. A command from the above-mentioned control panel is loaded into the multiple-printer control apparatus 1 from an operating interface 11.

The multiple-printer control apparatus 1 further includes a program storage memory 13 in which an execution program has been stored, a working DRAM 14, a working SRAM 15 and a non-volatile memory 16.

FIG. 6 illustrates printing times of the printers 50A ("A") to 50E ("E") connected to the multiple-printer control apparatus 1. A printing time is indicated for each size (size A5 or A6) of image capable of being printed. Data representing printing time is stored in the non-volatile memory 16 for each of the printers 50A to 50E.

Figure 7:
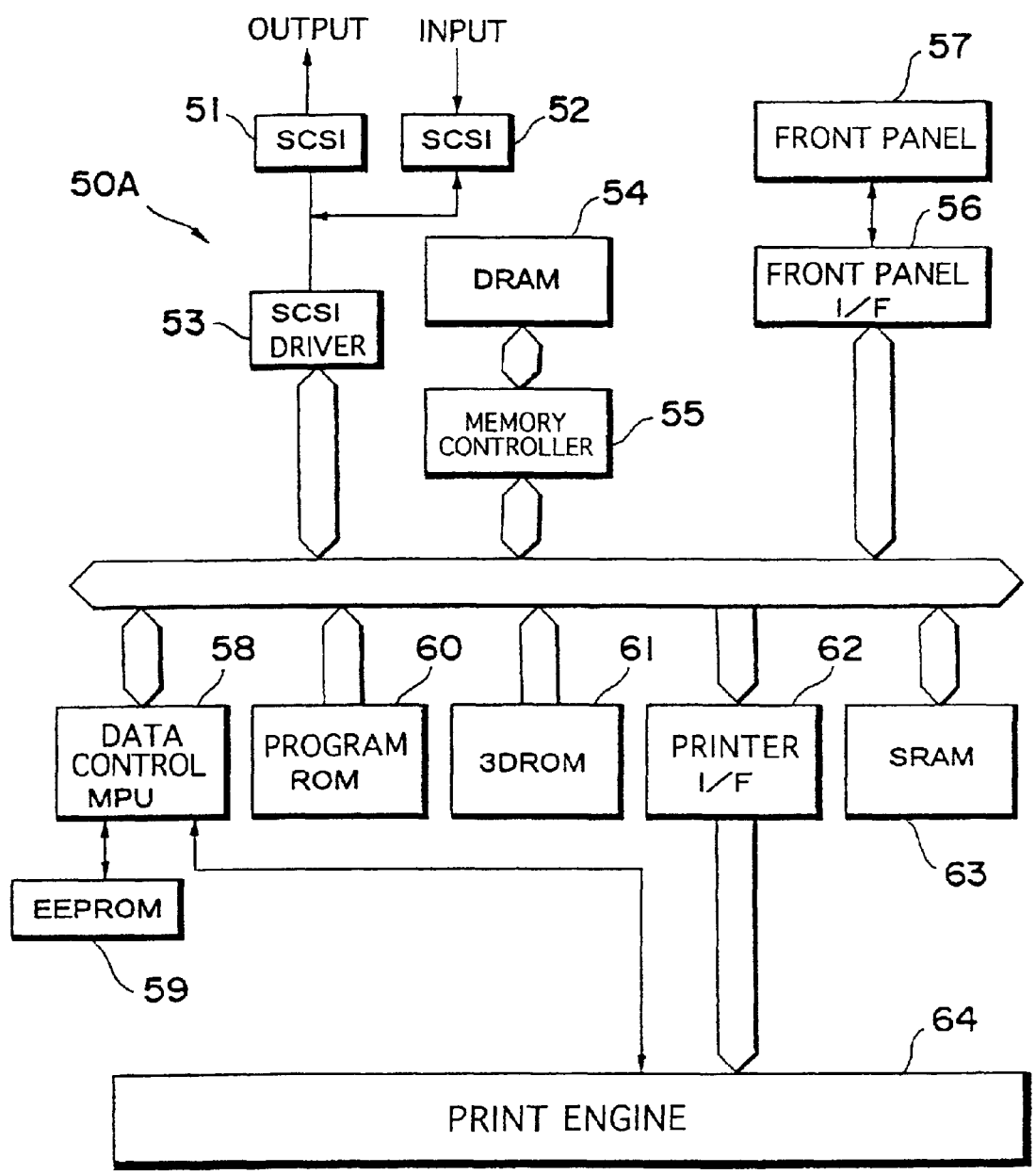
FIG. 7 is a block diagram showing the electrical construction of a printer.

FIG. 7 is a block diagram showing the electrical construction of the printer 50A. The printers 50B to 50E are similarly constructed.

The printer 50A includes an SCSI output terminal 51 for outputting image data, and an SCSI input terminal 52 for inputting image data. The input and output of image data is controlled by an SCSI driver 53.

The printer 50A is provided with an EEPROM 59. Data representing the above-mentioned ID that has been predetermined has been stored in the EEPROM 59. Readout of stored data from the EEPROM 59 is controlled by a data control MPU 58. The printer 50A is provided with a printer ROM 60 storing the program of the printer 50A. The printer 50A is operated based upon the program that has been stored in the ROM 60.

Color-correction data has been stored on a 3D-ROM 61 in the form of a LUT (look-up table). Image data is printed upon being subjected to a color correction by the 3D-ROM 61. An SRAM 63 is used as a working area. Image data that has entered from the SCSI input terminal 52 is stored temporarily in a DRAM 54 under the control of a memory controller 55.

The printer 50A is provided with a front panel 57. An operation control signal applied from the front panel 57 enters the memory controller 55 or data control MPU 58 via a front-panel interface 56. Image data that has been stored in the DRAM 54 is read out in response to the applied operation control signal and is subjected to a color correction in the 3D-ROM 61. The color-corrected image data is input to a print engine 64 via a printer interface 62. An image represented by image data that has entered from the multiple-printer control apparatus 1 is printed by the print engine 64.

Figure 8:
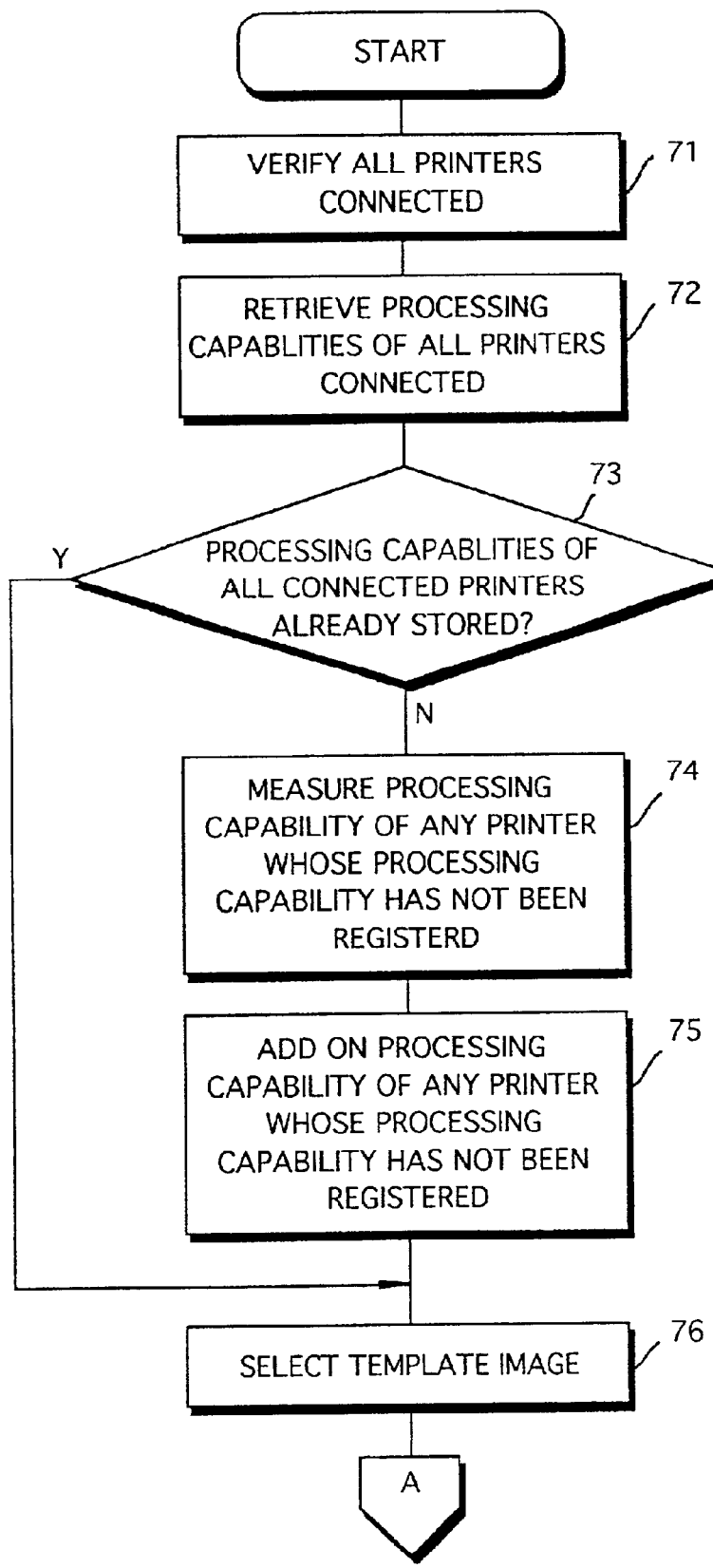
FIGS. 8 and 9 are flowcharts showing a processing procedure executed by the multiple-printer control apparatus of this embodiment.
Figure 9:
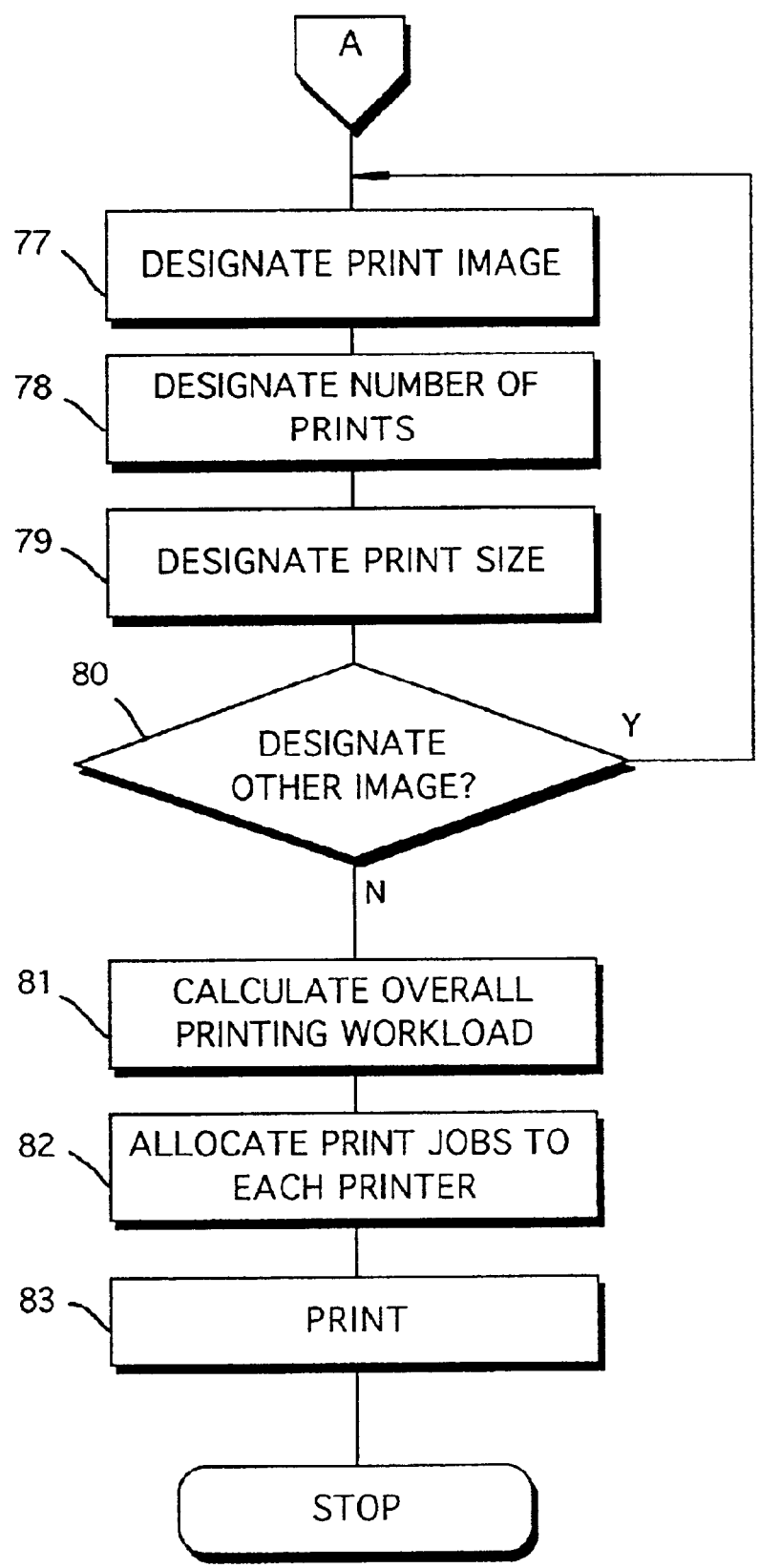

FIGS. 8 and 9 are flowcharts illustrating a processing procedure for controlling printing of print images by the multiple-printer control apparatus 1. FIGS. 10 to 16 illustrate display screens of the monitor display unit 40.

If the menu selection button 21 is pressed by the user, the menu selection screen shown in FIG. 3 is displayed on the monitor display unit 40 in the manner described above. Display of the printer verification menu is decided upon in response to selection of the printer verification menu and pressing of the enter button 30 on the menu selection screen. Which printers have been connected to the multiple-printer control apparatus 1 are verified (step 71).

Data representing the processing capability (printing time) of each printer is read out of the non-volatile memory 16 of the multiple-printer control apparatus 1 (step 72). Whether data representing processing capability has been stored in the non-volatile memory 16 is checked in regard to all printers that have been corrected to the multiple-printer control apparatus 1 (step 73).

If data representing processing capability has not been stored in the non-volatile memory 16 for even one printer among the printers connected to the multiple-printer control apparatus 1, the processing capability of the printer whose processing capability has not been stored is measured (step 74). In order to perform this measurement, image data representing an image of a predetermined size is transmitted to the printer whose processing capability is to be measured. The image is actually printed by this printer and the processing capability of this printer is measured (step 74). When the processing capability of the printer is measured, data representing the measured processing capability is transmitted from the printer to the multiple-printer control apparatus 1 and is added to the data in the non-volatile memory 16 (step 75).

If the processing capabilities of all printers connected to the multiple-printer control apparatus 1 have been stored in the multiple-printer control apparatus 1, the processing of steps 74 and 75 is skipped.

Figure 11:
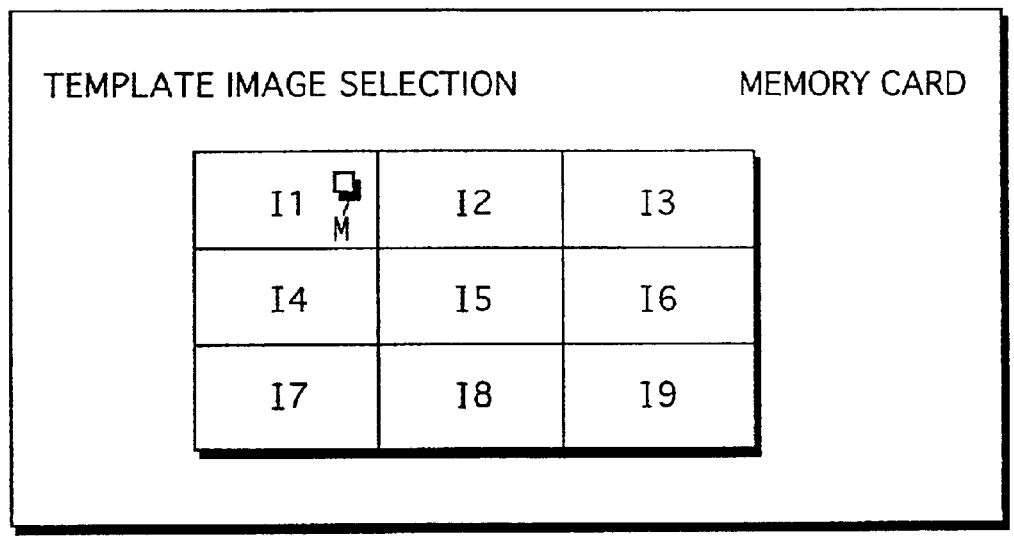

Next, the menu button 21 is pressed to call the menu selection screen. The template-image selection menu is selected on the menu selection screen and is entered. When this is done, a template-image selection screen is displayed on the display screen of the monitor display unit 40 as shown in FIG. 11. A template image is selected in the following manner:

First, the display screen of the monitor display unit 40 changes over to an image-media selection screen, as shown in FIG. 10.

The media that have been inserted into the multiple-printer control apparatus 1 are displayed on the image-media selection screen. The medium on which image data representing an image used as a background image has been recorded is selected by the user from among the media being displayed. The image data that has been recorded on the selected medium is read out and supplied from the multiple-printer control apparatus 1 to the monitor display unit 40.

Also displayed on the image-media selection screen is "NO BACKGROUND IMAGE". If the user selects "NO BACKGROUND IMAGE", then template-image selection processing is skipped.

Figure 12:
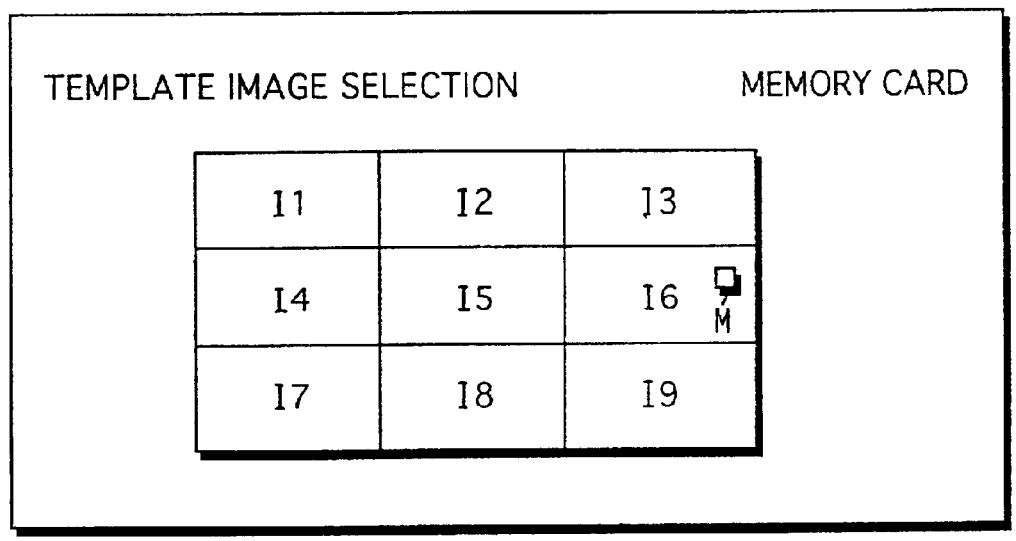

Image data that has been recorded on the memory card 34 inserted into the multiple-printer control apparatus 1 is read out (of course, image data that has been recorded on another recording medium and not on the memory card 34 may be read out) and nine frames of thumbnail images I1 to I9 are displayed in list form on the display screen of the monitor display unit 40 in the manner shown in FIG. 11. A cursor M is displayed at the upper right of one of the thumbnail images. The cursor M is moved among the thumbnail images by pressing the cursor buttons 27. The cursor M is positioned on a thumbnail image desired to be used as a background image and then the enter button 30 is pressed. When the enter button 30 is pressed, the thumbnail image on which the cursor M has been positioned is utilized as the background image. Pressing the enter button 30 causes the cursor M to be displayed as an oblique-face cusor, as shown in FIG. 12. (In the example shown in FIG. 12, the thumbnail image 16 has been selected.)

When selection of the template image is completed in this fashion, control shifts to processing for selecting the print image.

The input medium is selected (see FIG. 13) through processing similar to the above-described processing for selecting a template image. Here, it is assumed that the magneto-optic disk is selected as the input medium.

Figure 14:
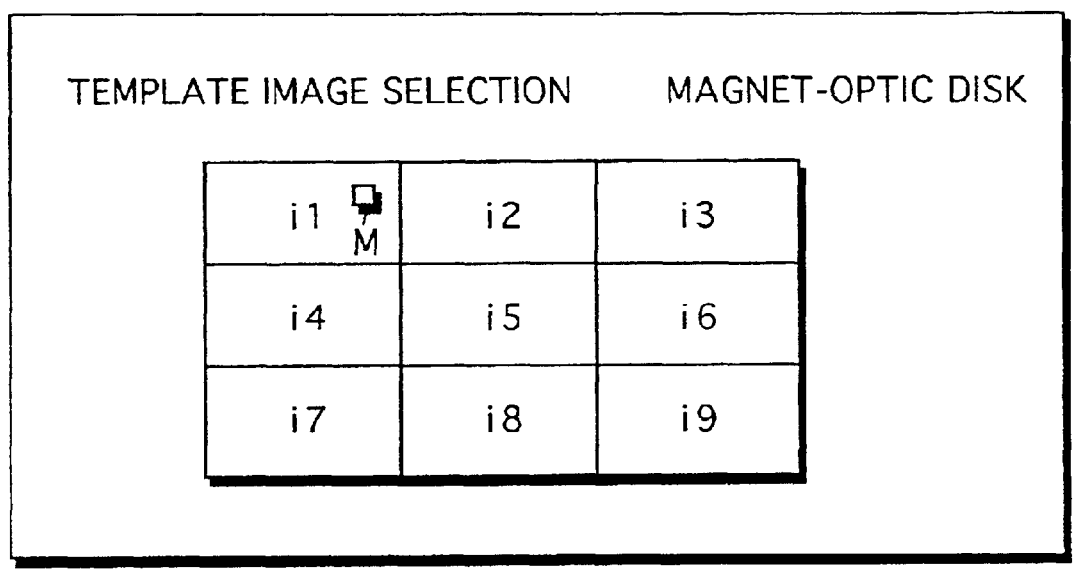

As shown in FIG. 14, nine frames of thumbnail images from i1 to i9 of images represented by image data that has been recorded on a magneto-optic disk are displayed in list form on the display screen of the monitor display unit 40. The cursor M is displayed in a manner similar to the case of the thumbnail images of the templates. The print image is decided upon by pressing the enter button 30 (step 77; here image i8 has been selected).

Figure 15:
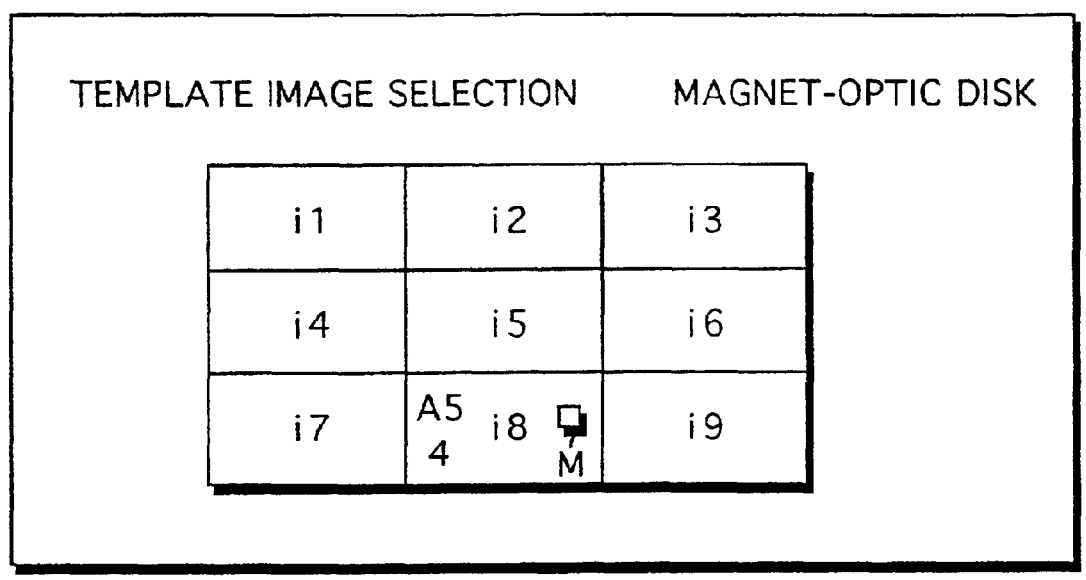

Next, using the keyboard 23, the number of prints of the print image is designated (step 78). The designated number of prints is displayed on the thumbnail image of the print image that has been designated, as shown in FIG. 15.

The print size is further selected by the user. Print size is specified using the size button 22 (step 79). The specified print size also is displayed on the thumbnail image of the designated print image in a manner similar to the number of prints.

If there is a further image to be printed ("YES" at step 80), processing from steps 77 to 79 is repeated.

The overall printing workload necessary to print all print images that have been specified by the user is calculated (step 81).

FIG. 17 is a table for calculating the overall printing workload.

Here ten frames of images, namely i1, i2, i8, i12, i27, i50, i101, i105, i122, i175, are to be printed. When printing is performed at a print size of A5, "2" is set in regard to a job quantity. When printing is performed at a print size of A6, "1" is set in regard to a job quantity. For example, the job quantity in a case where ten prints of the print image "i1" are printed at the print size A5 is 10 prints×2=20 jobs, and the job quantity in a case where five prints of the print image "i2" are printed at the print size A6 is 5 prints×1=5 jobs. By summing all job quantities of the print images, the overall printing workload is calculated.

When the overall printing workload has been calculated, print jobs are allocated to each of the printers connected to the multiple-printer control apparatus 1 (step 82). The allocation of print jobs is carried out in such a manner that print processing will be executed simultaneously using a plurality of printers to minimize the time needed for the completion of all prints (i.e., so that the print processing performed by all of the printers 50A to 50E will end substantially simultaneously). The details of this allocation processing will be described later.

The printers execute print processing in accordance with the print jobs that have been allocated to them (step 83). The details of this print processing will be described later. A print-status verification screen is displayed on the monitor display unit 40 during printing, as shown in FIG. 16. The print-status verification screen displays the fact that printing is in progress, the input medium (the magnetic disk in the example illustrated in FIG. 16) on which the image currently being printed has been recorded, the total number of prints specified, the number of prints completed, the date of photography of the frame being printed and the frame No. of this frame.

Figure 19:
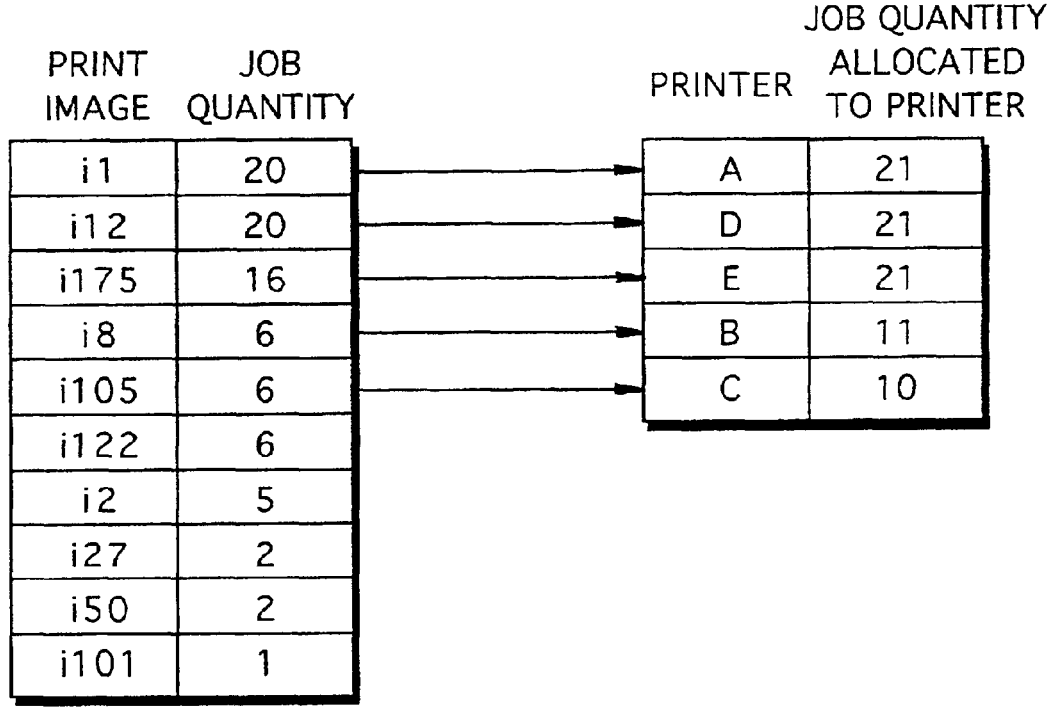
Figure 20:
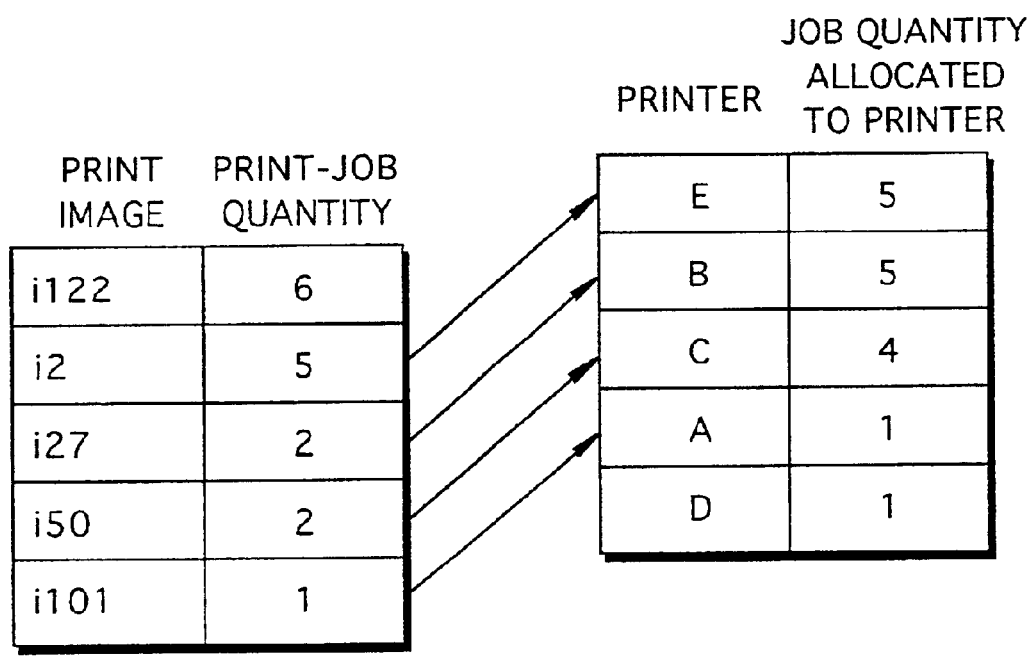

FIG. 18 illustrates the processing capabilities of the printers, FIGS. 19 to 21 show the processing for allocating print jobs to each of the printers, and FIG. 22 shows the relationship between print images that have been allocated to each of the printers and the number of prints of these print images.

The processing capabilities of the printers that have been connected to the multiple-printer control apparatus 1 are such that if the processing capability of printers "B" and "C" is "1", then printers "A", "D" and "E" have the processing capability "2", which is twice that of printers "B" and "C". The overall processing capability of all printers connected to the multiple-printer control apparatus 1 is obtained merely by summing the processing capabilities of all of the printers. This is represented by "8" in the case of FIG. 18.

Since the overall printing workload is "84", on the other hand, as illustrated in FIG. 17, the job quantity per processing capability can be calculated by dividing the overall printing workload "84" by the overall processing capability "8" of the printers. The job quantity per processing capability obtained, therefore, is 10.5, in accordance with the following equation:

$$84 \div 8 = 10.5 \quad (1)$$

As set mentioned above, the printers "A", "D" and "E" have twice the processing capability of printers "B" and "C". The job quantities allocated to the printers, therefore, is "21" for printers "A", "D" and "E", "11" or printer "B" and "10" for printer "C" (the job quantities allocated to printers "B" and "C" may be reversed if desired), as shown in FIG. 18.

As illustrated in FIG. 19, the print images are sorted in order of decreasing print-job quantity, and the printers are sorted in order of decreasing allocated job quantity.

Print image i1 is printed by printer "A", print image i12 by printer "D", print image i175 by printer "E", print image i8 by printer "B", and print image i105 by printer "C". Since the printers that will print the print images i1, i12, i175, i8 and i105 have been decided, the printers that will print the remaining print images i122, i2, i22, i50 and i101 are decided.

As illustrated in FIG. 20, the remaining job quantities to be allocated to the printers are "5" for printer "E", "5" for printer "B", "4" for printer "C", "1" for printer "A" and "1" for printer "D". The print-job quantity of print image i122 is "6", which exceeds the remaining job quantities to be allocated to the printers. The printers that will print the print images other than print image i122 are decided. The printers are decided in order of decreasing print-image job quantity and in order of decreasing allocated job quantity.

Print image i2 is printed by printer E, print image i27 by printer B, print image i50 by printer C and print image i101 by printer "A".

As shown in FIG. 21, the remaining job quantities to be allocated to the printers are "3" for printer "B", "2" for printer "C" and "1" for printer "D". Thus, print image i122 is allocated to printers "B", "C" and "D".

The print images are allocated to the printers in the manner shown in FIG. 22. Printer "A" prints ten prints of print image i1 and one print of print image i101. Printer "B" prints six prints of print image i8, one print of print image i27 and three prints of print image i122. Printer "C" prints three prints of print image i105, one print of print image i50 and two prints of print image i122. Printer "D" prints ten prints of print image i12 and one print of print image i22. Printer "E" prints eight prints of print image i75 and five prints of print image i2.

Figure 23:
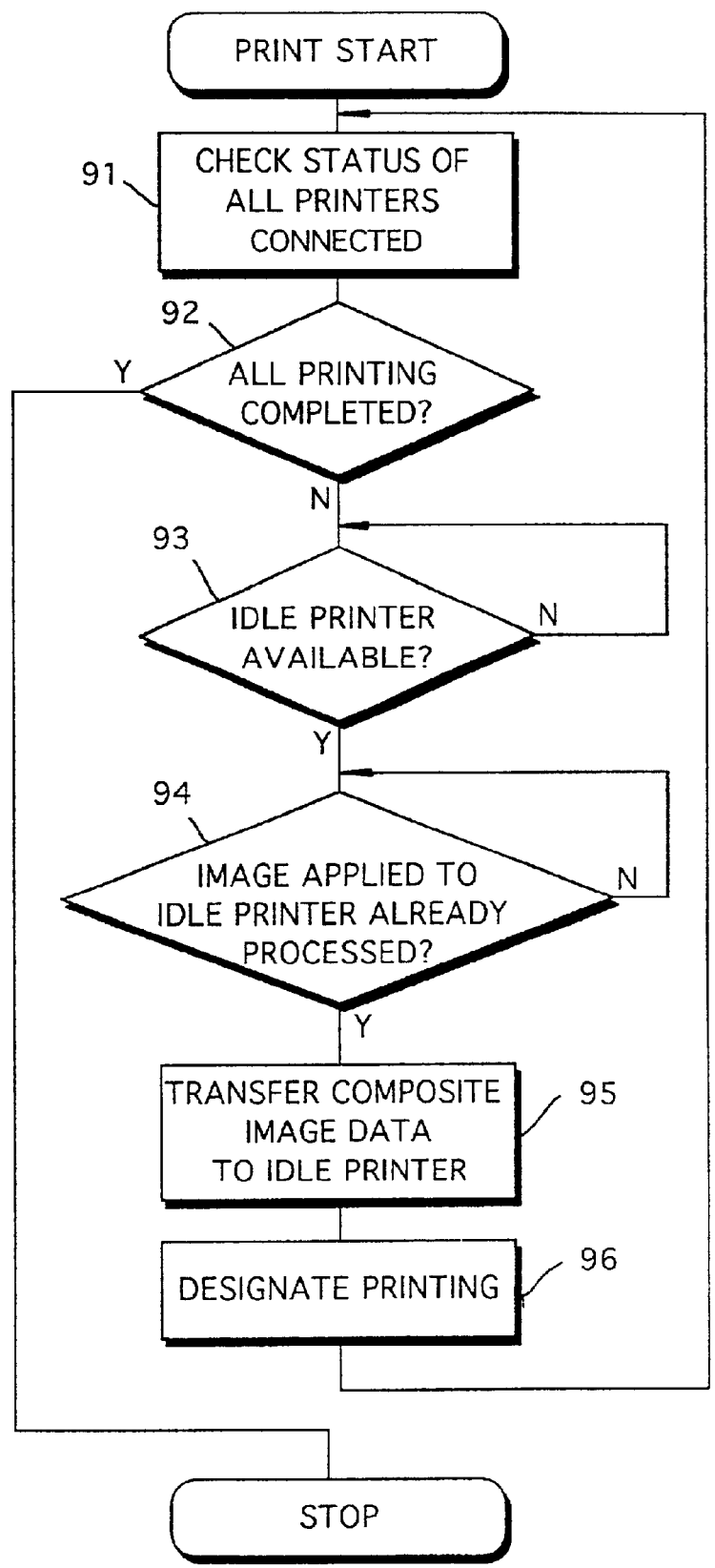
FIGS. 23 and 24 are flowcharts illustrating a processing procedure executed by the multiple-printer control apparatus of this embodiment.
Figure 24:
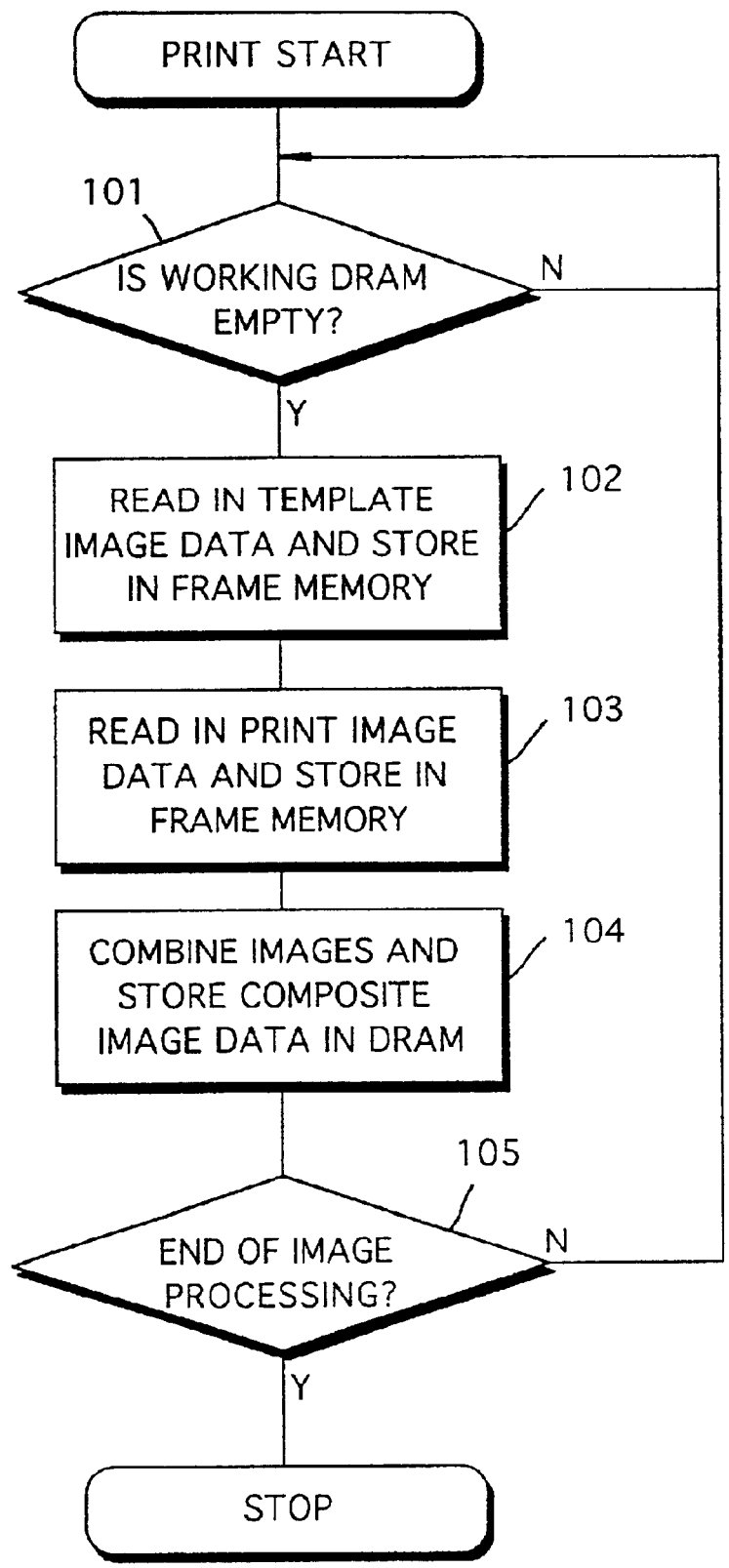

FIGS. 23 and 24 are flowcharts illustrating procedures of print processing. The processing shown in FIG. 23 is executed in parallel with the processing shown in FIG. 24.

As shown in FIG. 23, the status of each printer connected to the multiple-printer control apparatus 1 is checked (step 91).

If the printing of all print images is not finished ("NO" at step 92), it is determined whether an idle printer (a printer not currently executing print processing) is available (step 93).

Meanwhile, in FIG. 24, it is determined whether the working DRAM 14 is empty (step 101). If the working DRAM 14 is empty ("YES" at step 101), designated template image data is read in from the input medium and stored temporarily in the frame memory 6 (step 102). Designated print image data is read in and this is stored temporarily in the frame memory 6 (step 103). The image represented by the print image data is combined with the image represented by the template image data to generate composite image data. The generated composite image data is stored in the working DRAM 15 (step 104).

With reference again to FIG. 23, when an idle printer is available ("YES" at step 93), it is determined whether image processing (the processing of steps 101 to 105 in FIG. 24) of image data applied to the idle printer has been completed (step 94). If this image processing has been completed, the composite image data that has been stored in the working DRAM 14 is read out and transferred to the idle printer (step 95). When the composite image data is read out of the working DRAM 14, processing (the processing of steps 102 to 104 in FIG. 24) of the next image is executed.

When the composite image data is transferred to the idle printer, data indicative of a print command is transmitted to the printer to which the composite image data was transferred and print processing is executed. Printers capable of executing print processing are successively sent composite image data that has been allocated to them and print processing is executed by a plurality of printers in parallel. Thus, printing can be executed efficiently.

In the embodiment described above, image data is transmitted to printers and images represented by the print data are printed. However, an arrangement may be adopted in which not only images but also data representing characters such as text and symbols is transmitted to the printers so that the characters may be printed.

As many apparently widely different embodiments of the present invention can be made without departing from the spirit and scope thereof, it is to be understood that the invention is not limited to the specific embodiments thereof except as defined in the appended claims.

What is claimed is:

1. A multiple-printer control apparatus for controlling a plurality of printers, comprising:

a print-processing capability detection unit for detecting print processing capability of each of the plurality of printers;

an overall-workload detection unit for detecting overall workload including the quantity of printing to be performed using the plurality of printers that are capable of printing as determined by the print processing capability detection unit; and a printer control unit for performing control, on the basis of print processing capabilities detected by said print-processing capability detection unit and the overall workload detected by said overall-workload detection unit, in such a manner that print data, which represents at least one of images and characters to be printed, is applied to each of the plurality of printers that are capable of printing as determined by the print processing capability detection unit, and each printer of the plurality of printers prints at least one of images and characters the number of sheets whereof conforms to a number of prints.

2. The apparatus according to claim 1, wherein said printer control unit controls the plurality of printers in such a manner that the print processing executed by the plurality of printers ends approximately simultaneously.

3. The apparatus according to claim 1, wherein said print-processing capability detection unit includes:

a print-processing capability data storage unit for storing, in advance, data representing the print processing capability of each printer; and a unit for reading out data representing print processing capability that has been stored in said print-processing capability data storage unit.

4. The apparatus according to claim 3, wherein said print-processing capability detection unit has a determination unit for determining whether data representing print processing capability of a connected printer has been stored in said print-processing capability data storage unit; and in response to a determination by said determination unit that data representing print processing capability of a connected printer has not been stored in said print-processing capability data storage unit, predetermined print data is applied to the printer for which it has been determined that the data representing print processing capability has not been stored, and this printer is caused to print the predetermined print data, whereby the print processing capability of this printer is detected.

5. The multiple-printer control apparatus of claim 1, wherein the overall workload detection unit detects the overall workload by summing job quantities and allocating at least one of images and characters based on the summed job quantities.

6. The apparatus of claim 1, wherein the printing to be performed includes a plurality of images to be printed where the plurality of images is greater than the number of printers.

7. A multiple-printer control method for controlling a plurality of printers, comprising:

detecting processing capability of each of the plurality of printers;

detecting overall workload including the quantity of printing to be performed using the plurality of printers that are capable of printing as determined by detecting the processing capabilities; and performing control on the basis of the detected print processing capabilities and overall workload in such a manner that print data, which represents at least one of the images and characters to be printed, is applied to each of the plurality of printers that are capable of printing as determined by detecting the processing capabilities, and each printer of the plurality of printers prints at least one of images and characters the number of sheets whereof conforms to a number of prints.

8. The multiple-printer control method of claim 7, wherein the overall workload is detected by summing job quantities and allocating at least one of images and characters based on the summed job quantities.

9. The method of claim 7, wherein the number of images to be printed is greater than the number of printers.

10. A multiple-printer control apparatus for controlling a plurality of printers comprising:

a print-processing capability determining unit for determining print processing capability of each of the plurality of printers;

an overall-workload determining unit for determining overall workload including the quantity of printing to be performed using the plurality of printers; and a printer control unit for allocating, based on the determined print-processing capabilities of each of the plurality of printers and on the determined overall workload, the printing to be performed at each of the plurality of printers wherein each printer of the plurality of printers prints at least one of images and characters the number of sheets whereof conforms to a number of prints.

11. The apparatus of claim 10, wherein the printer control unit allocates the printing to be performed wherein print processing executed by the plurality of printers ends approximately simultaneously.

12. The apparatus of claim 10, wherein the print-processing capability determination unit determines print processing capabilities by applying predetermined print data to one of the plurality of printers.

13. The apparatus of claim 10, wherein the printing to be performed includes a plurality of images to be printed where the plurality of images is greater than the number of printers.

* * * * *